United States Patent [19]

Velke, Sr. et al.

[11] Patent Number: 5,058,838
[45] Date of Patent: Oct. 22, 1991

[54] SUPPORT FOR VARIABLY SIZED ELECTRICALLY ENERGIZED TUBING

[76] Inventors: David C. Velke, Sr., 3305 Aldie Rd., Catharpin, Va. 22018; George P. Marsden, 7621 Mary Cassatt Dr., Potomac, Md. 20854; Burton C. Leffingwell, 242 Meadows La., N.E., Leesburg, Va. 22075

[21] Appl. No.: 593,974

[22] Filed: Oct. 9, 1990

[51] Int. Cl.⁵ .............................................. F16L 3/00
[52] U.S. Cl. ................................ 248/50; 174/138 H; 248/68.1
[58] Field of Search ...................... 248/50, 68.1, 221.3, 248/221.4, 65; 24/336, 10 R, 16 R, 532, 483, 484; 174/138 H

[56] References Cited

U.S. PATENT DOCUMENTS

| | | | |
|---|---|---|---|
| 2,050,559 | 8/1936 | Budnick | 248/50 |
| 2,590,277 | 3/1952 | Skok | 248/50 |
| 2,613,051 | 10/1952 | Baum | 248/50 |
| 2,629,814 | 2/1953 | Brown | 174/138 HX |
| 2,645,831 | 7/1953 | Staaf | 248/50 |
| 2,885,538 | 5/1959 | Mahon | 174/138 H X |
| 3,135,488 | 6/1964 | Leonard | 248/50 |
| 4,011,397 | 3/1977 | Bouche | 24/484 X |
| 4,864,697 | 9/1989 | Sparks | 24/336 |
| 4,997,147 | 3/1991 | Velke et al. | 248/68.1 X |

FOREIGN PATENT DOCUMENTS 360350 11/1931 United Kingdom .................. 248/50

Primary Examiner—J. Franklin Foss
Attorney, Agent, or Firm—Richard C. Litman

[57] ABSTRACT

A supporting assembly for energized tubing includes an elevated post joined to pairs of oppositely facing and laterally spaced apart upper and lower generally C-shaped clamp arms at its top end and to a base at its bottom end. A retainer member is connected to the base and includes a latch element engageable with catch elements on the base and which serve to both limit angular displacement of the base, post and clamp arms while temporarily alternately locking them in either an open or closed position. In the open position, a cable may be inserted between the spaced apart lower clamp arms and a larger diameter portion of tubing inserted between the spaced apart upper clamp arms. Thence, by angularly displacing the post and arms substantially 90 degrees, the pairs of clamp arms are moved into firm engagement with the tubing while captivating the cable therebeneath. With the assembly components constructed of a synthetic material exhibiting limited resilience, a positive biasing force is delivered upon a captive tubing and the assembly retained in a clamping mode by the latch element until a user desires to reverse the displacement to remove the tubing and cable.

12 Claims, 2 Drawing Sheets

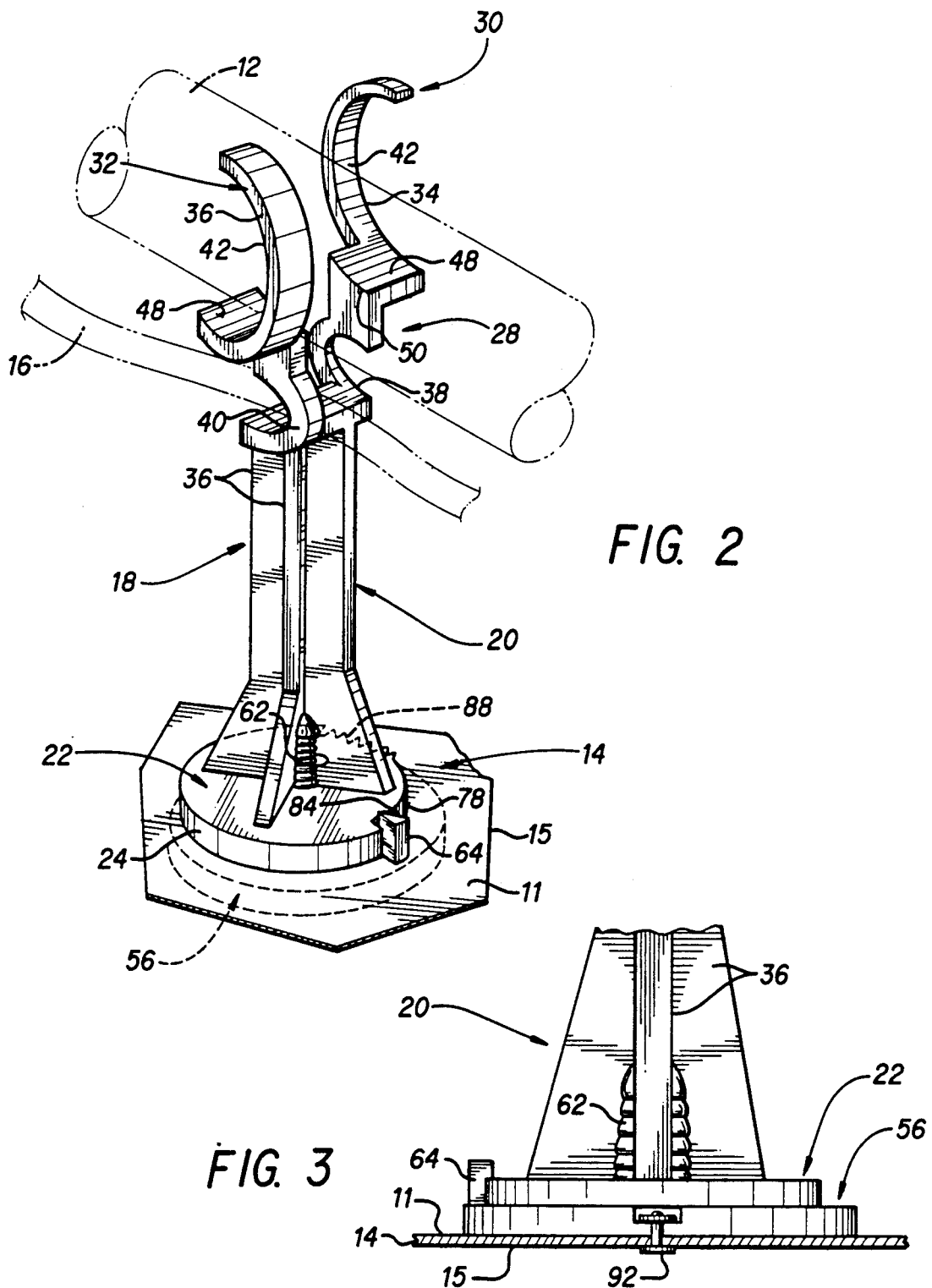

SUPPORT FOR VARIABLY SIZED ELECTRICALLY ENERGIZED TUBING

FIELD OF THE INVENTION

This invention relates to an improved insulating support for electrically energized elongated members, and more specifically, to an adjustable mounting device for both the luminous tubing as used in sign displays such as neon signs and the like, as well as for the high voltage cable associated therewith.

BACKGROUND OF THE INVENTION

Conventional advertising signs usually feature variously shaped luminous hollow tubing filled with an excitable gas such as neon. The letters or design of the sign are formed by a plurality of adjacently or serially mounted sections or lengths of the neon tubing. Each such section usually comprises a pre-curved or bent tubing length requiring two or more support means when it is installed in its display environment, such as a building front. It has been awkward at least, to readily affix this sign tubing to existing mounting or support devices, especially when it will be appreciated that most installations involve elevations well above the ground with the workmen operating from ladders or scaffolding and frequently mounting the tubing within shadow boxes suspended in a vertical plane. Additionally, a problem has existed in providing convenient means to secure the running lengths of high voltage electrical cable leading to the ends of each tube length within a sign assembly. Furthermore, the need exists to provide a support device that will accommodate tubing of various diameters while allowing of the same positive clamping action, regardless of the size tubing involved.

DESCRIPTION OF THE RELATED ART

Various means have been used to secure gas tubes in the desired position as employed in a sign. The present invention is an improvement over the tubing support as advanced in our co-pending patent application Ser. No. 424,492 filed Oct. 31, 1989. In this prior invention, the support comprises a relatively fixed lower member to which is adjustably attached an upper head member having a single pair of clamp arms. Most frequently, the tubes are wired or taped to support members and the related conductive high-voltage cables remain loose or are taped to any available structure. Mounting an entire luminous system at the high altitudes where the signboards are usually placed demands precise and delicate manipulation and involves considerable risk, particularly when an intricate advertisement design is being created. Disclosed in the prior art have been different mounting means that provide partial solutions to the problem as in the case of U.S. Pat. No. 2,613,051 issued to Baum. The tube supports, as in this patent, provide a pair of grip fingers adapted to be rotated into engagement with a tube. The fingers are mounted for infinite arcuate adjustment and do not preclude the sliding or rattling of the tubes due to wind or vibrations, as there is no biasing of the fingers into a clamping arrangement. Nor do any of the conventional supports include means to secure associated high-voltage wires and prevent them from intertwining and increasing the risk of a short-circuit and explosion. Hence, there is an acute need for an efficient arrangement for mounting and reliably securing energized tubing together with any electrical cables connected thereto.

SUMMARY OF THE INVENTION

By the present invention, an improved adjustable support for energized tubing of various sizes is provided and which allows one-handed manipulation to quickly and effortlessly capture and release both the tube as well as any electrical cable that may be associated with the tubing while simultaneously achieving a positive clamping action of both captive components. A support member having a port provided with an uppermost clamp assembly includes a base having variable catch means and which cooperates with a relatively fixed retainer or adjustment member. To allow for the simultaneous capture and release of variably sized tubing and wiring, the clamp assembly comprises two adjacent pairs of integrally formed upper and lower arcuate clamp arms. By constructing the support member of an integral piece, formed of any suitable plastics composition exhibiting limited resilience, a degree of biasing or torque force is conveyed from one end to the other when the support is rotated into a locked condition, with an elongated tubing clamped within the clamp arms.

Accordingly, one of the objects of the present invention is to provide an improved mounting assembly for energized tubing wherein a single turn of a clamp assembly reliably locks the tubing and associated wiring within the clasp of the clamp assembly.

It is another object of this invention to provide a gripping device for the tubing support that applies a constant biasing force to the tubing to retain it in a fixed position, regardless of the variable diameters in which the tubing is offered.

It is a further object of the present invention to provide an integral support of at least slightly resilient composition for energized tubing including an adjustable locking member at its base with arcuate clamp arms at its top end for accommodating variably sized tubing as well as associated wiring.

Still another object of the present invention is to provide a support for variably sized energized tubing wherein a single turn of the gripping device locks the tubing and simultaneously captively retains adjacent electrical cables without any additional securing means or tools and solely by means of single handed manipulations, with variations in tubing size being accommodated by a bottom most retainer and adjustment member which also serves as means for mounting the support to a relatively fixed element while allowing of rotary displacement thereabout.

The present invention will be better understood from the following detailed description of a preferred embodiment with reference being made to the accompanying drawings, in which:

BRIEF DESCRIPTION OF THE DRAWINGS

FIG. 2 is a side elevation of the device of FIG. 1, shown in the displaced open position; and FIG. 3 is a partial side elevation of an alternative mounting of the lowermost retainer member.

Similar reference characters designate corresponding parts throughout the several figures of the drawings.

DESCRIPTION OF THE PREFERRED EMBODIMENT

Figure 1:
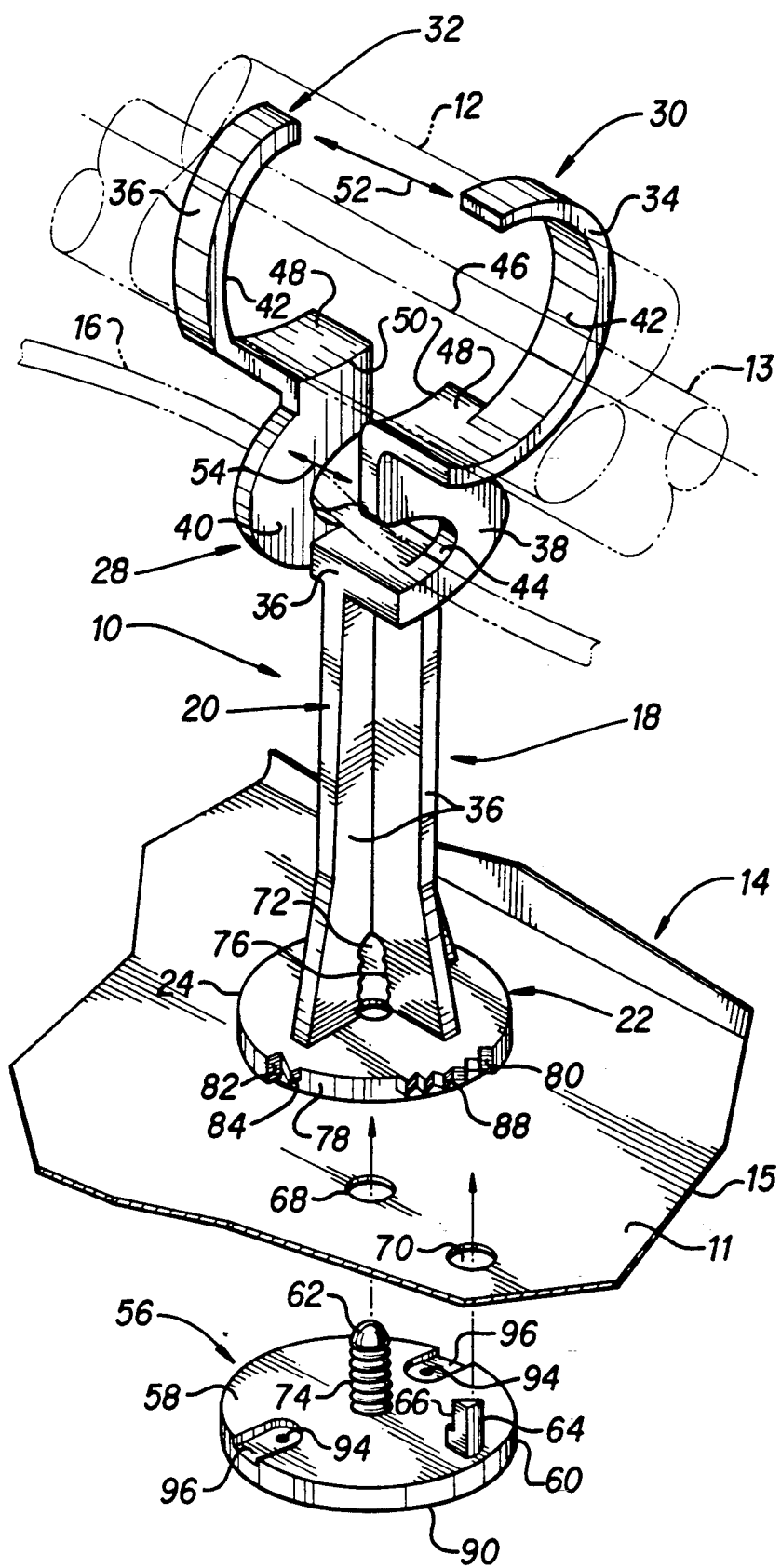
FIG. 1 is an exploded top perspective view of a support assembly according to the present invention, as it appears when in the closed or locked position.

Referring now to the drawings, particularly FIG. 1, the present invention will be seen to relate to a novel insulative support assembly 10 especially adapted to positively retain a length of luminous gas tubing 12, such as a neon gas tube as used in signs. The assembly 10 is constructed of any suitable insulative or dielectric composition exhibiting substantial rigidity yet when fabricated into elongated elements, exhibits a nominal degree of resilience, for reasons which will become apparent hereinafter. A typical composition which has been found to be satisfactory is LEXAN, a polycarbonate resin manufactured by General Electric Co.

In the erection of neon type signing, the tubing 12 will be understood to comprise one or more individual tube sections or lengths which when suitably mounted alone or in combination, represent at least part of the configuration of a letter or other graphic portion of the sign. Depending upon the length and shape of the tube sections, two or more support devices are used to maintain each section in a fixed manner, spaced from a relatively stationary backing member 14 which quite often comprises the rear wall of a letter shadow box. With the present support, ready means are provided to permit the rapid attachment of the assemblies 10 to the backing 14 as well as a quick, one-handed manner of simultaneously clamping or releasing both the tubing 12 as well as any associated high voltage wiring cable 16.

The assembly 10 comprises a unitary support member 18, approximately one-half the length of which includes an elongated post 20 joined at its lower end to a foot or base 22 having an outer periphery 24. Preferably, the post 20 is configured to include a plurality of radiating flanges 36, the advantages of which will be described hereinafter. The captive engagement of the tubing 12 and cable 16 is provided by the clamp assembly 28 attached to the top of the post 20.

The clamp assembly 28 will be seen to include a pair of arm members 30,32 disposed substantially parallel one another and extending upwardly from a common base 36. Each member 30,32 includes an arcuate or C-shaped upper clamp arm 34 or 36 and a lower, smaller arcuate or C-shaped lower clamp arm 38 or 40. The curved inner surface 42 of the upper clamp arms 34,36 as well as the curved inner surface 44 of the lower clamp arms 38,40 subscribe an arc of at least 180 degrees so that when the two arm members 30,32 are viewed from either end, the respective pairs of superimposed upper and lower clamp arms each encompass a combined area substantially defining a full circle. The diameters of these full circles is calculated to accommodate the largest anticipated tubing and cable diameters when the upper clamp arms 32,34 are positioned in vertical planes transverse to the center axis 46 passing therethrough. In this manner, when a smaller diameter tubing 13 is to be supported, clockwise rotation of the support member 18 will cause the clamp arms to close inwardly of the center axis 46 to effectively secure the smaller tubing.

Insertion and removal of both the cable 16 and tubing 12 is accomplished when the support assembly 10 is angularly displaced from the FIG. 1 position approximately 90 degrees about its vertical axis. The manner of accomplishing this displacement will be described following further details pertaining to the clamp assembly 28. The bottom of the inner surface 42 of each upper clamp arm 34,36 will be seen to comprise an enlarged upwardly facing rest or shelf 48 having an inside edge 50. The two edges 50,50 are axially spaced apart a distance less than the diameter of the smallest tubing intended to be used with the device so that when installing or removing the tubing, with the support member 18 angularly positioned as in FIG. 2, the tubing will be disposed upon these edges 50,50 and prevented from dropping any lower. At this point it will be noted that the axial space 52 between the two upper clamp arms 34,36 is greater than the diameter of the largest tubing to be used. This allows unencumbered insertion and removal of any desired tubing when the arm members are rotated to a position transverse the axis of the tubing 12. Additionally, it will be observed that the axial spacing 54 between the two lower clamp arms 38, 40 is sufficient to permit free passage of the associated cable 16.

The support member 18 is attached, in an adjustable manner, to an appropriate relatively stationary element such as the backing sheet 14, by means of a retainer or adjustment member 56. Alternative attachment modes are available, depending upon whether or not ready access may be had to the rear or underside 15 of the sheet 14. If such access is available, the arrangement of FIG. 1 may be utilized and wherein the retainer member 56 is adapted to be disposed with its top surface 58 flush with the sheet underside 15. The retainer preferably comprises a disc-like member having a circular periphery 60 and a centrally disposed upstanding mounting element 62. A latch element 64 projects upwardly, adjacent the outer edge 60 and will be seen to include a radially inwardly directed nose 66. With this construction, the retainer 56 is positioned behind the backing 14 with the mounting element 62 and latch element 64 passing through two openings 68,70 similarly spaced from one another. The connection between the retainer and support member is achieved by means of the snap-fitting of the mounting element 62 into a connection cavity 72 formed within the center of the base 22 and lower portion of the post 20. Mating, releasable retention means such as the illustrated annular ribs 74,76 on the mounting element 62 and within the cavity 72, are exemplary of the type of retention means usable with the yieldable plastics composition of the support assembly 10.

With the backing 14 sandwiched between the connected support member 18 and retainer member 56, the support member may be selectively arcuately displaced, within the limits as permitted by the latch element 64. This latch element will be seen to be disposed within the confines of an arc as defined by the cut-out or notched segment 78 provided in the periphery 24. While the mounting element 62 axially connects the support member 18 with its base 22 juxtaposed the backing sheet 14, the annular formation of the cooperating ribs 74,76 allows the user to manually rotate or angular displace the support member 18 substantially 90 degrees relative the stationary retainer member 56 and its upstanding latch element 64.

The two ends of the notched segment 78 are defined by a full closed shoulder 80 and full open shoulder 82. When the support assembly is rotated counter-clockwise until the full open shoulder or stop 82 abuts the latch element 64, the assembly appears as in FIG. 2 and the clamp assembly 28 is positioned with the two arm members 30,32 transverse of the intended final axis 46 of the tubing to be supported. The assembly is retained in this full open position as the nose 66 of the latch element 64 is biased past an open catch member 84 and abuts the immediately adjacent shoulder 82. In this position, local vibrations, gravity or accidental striking of the assembly will not affect the displacement of the support assembly and a cable 16 may be lowered or raised through the space 54 between the two lower clamp arms 38,40 while a tubing section may likewise be raised or lowered through the wider space 52 defined between the upper clamp arms 34,36.

To securely lock a tubing and cable as positioned within the respective spaces 52,54, one merely rotates the support member 18 in a clockwise direction, causing the oppositely facing pairs of clamp arms to close in on the contained tubing and cable until the inner surfaces 42 of the upper clamp arms 34,36 abut the periphery of the tubing 12 or 13. During this latter rotation, the open lock catch 84 deflects the nose of the latch element 64 outwardly as the base 22 is angularly displaced and after about a 45 degree rotation, the first of a plurality of adjacent variable lock catches 88 sequentially engage and deflect the latch element 64 until the upper clamp arms 34, 36 engage the opposite sides of the captive tubing. In view of the limited degree of resilience of the material of the assembly 10, it will be appreciated that a biasing clamping action may be applied by the clamp arms about the tubing by rotating the support member base 22 until an extra one or two teeth of the lock catch means 88 is moved past the latch element 64.

The construction of the post 20 readily lends itself to the above manipulation. The inherent resilience of the material of the support member, preferable of synthetic plastics, will be understood to allow a slight twisting of the base 22 relative the clamp assembly 28 so that a constant biasing force will be applied to a clamped tubing. The plurality of radially extending flanges 26 not only absorbs and transmits torque forces between the two ends of the assembly 10 but also facilitates a positive grasping of the post to enable a user to lock or unlock the assembly, against the force of the latch element nose 66.

The support assembly 22 will usually be mounted in a horizontal manner, that is, against a relatively stationary vertical member such as the rear or base of a sign letter shadow box. The fixed backing sheet 14 represents a typical stationary member having the exposed interior or front face 11 and the normally hidden rear face 15. In those installations wherein the rear face 15 is not accessible, it is obvious that alternative means must be utilized to provide for the mounting of the support member 18. The same retainer member 56 also may be used as in FIG. 3 wherein the retainer rear surface 90 is flushly disposed upon the sheet front face 11 and secured thereto with suitable fasteners, such as by the pop rivets 92 inserted through a pair of diametrically opposed holes 94 (FIG. 1). To preclude interference between the upper heads of these fasteners and the subsequently connected base 22, each hole 94 is surrounded by a recess 96 as shown in FIG. 1. The operation of the support assembly is similar, regardless of the mounting of the retainer member 56, as the latch element 64 is long enough to pass through the backing sheet 24 and still cooperate with the catch means 84,88 within the notched segment 78.

It is to be understood that the present invention is not limited to the sole embodiments described above, but encompasses any and all embodiments falling within the scope of the following claims.

We claim:

1. A support assembly for elongated tubing and adapted to be affixed to a relatively stationary member comprising;
   a support member including an elevated post having a central longitudinal axis and joined at opposite ends to a bottom base and a top clamp assembly,
   retainer means adapted to be affixed in a stationary disposition and having attachment means adapted to mount said bottom base thereto for arcuate displacement of said support member about said central longitudinal axis between an open position and a closed position,
   said clamp assembly including a pair of oppositely facing and adjacent arcuate upper clamp arms, said upper clamp arms laterally spaced from one another along a common axis a distance no less than the diameter of a length of tubing to be retained thereby, said distance defining a tubing insertion and removal space,
   said bottom base provided with catch means including open and closed catch means, and
   latch means on said retainer means engageable with said bottom base catch means to secure said support member in either said open or closed position, whereby
   following placement of a length of tubing within said tubing insertion and removal space, said support member is angularly displaceable about said central longitudinal axis as said bottom base catch means is shifted from said open catch means to said closed catch means with a simultaneous displacement of said upper clamp arms to a position engageable with the tubing.

2. A support assembly according to claim 1 wherein, said post comprises a plurality of radially projecting flanges.

3. A support assembly according to claim 1 wherein, said upper clamp arms each include an inner surface defining an arc of at least 180 degrees.

4. A support assembly according to claim 1 wherein, each said clamp arm defines a generally C-shaped configuration.

5. A support assembly according to claim 1 wherein, said clamp assembly includes a second pair of arcuate clamp arms each attached beneath one said upper clamp arm, and
   said second pair of clamp arms defining an arc having a smaller radius than that of said upper clamp arms, whereby
   a smaller diameter elongated member is insertable and removable from said clamp assembly, beneath said tubing.

6. A support assembly according to claim 1 wherein, said elevated post, top clamp assembly and bottom base comprise an integral element.

7. A support assembly according to claim 1 wherein, said elevated post, top clamp assembly and bottom base are fabricated of a synthetic resinous material exhibiting limited resilience.

8. A support assembly according to claim 1 wherein, said bottom base catch means includes a roughened area engageable by said latch means on said retainer means.

9. A support assembly according to claim 1 including, a connection cavity within said bottom base and elevated post, said attachment means on said retainer means including an upstanding mounting removably attachable within said connection cavity.

10. A support assembly according to claim 1 wherein, said latch means comprises an upstanding latch element on said retainer means and having a nose portion engageable with said bottom base catch means.

11. A support assembly according to claim 1 wherein, the stationary member comprises sheet material having interior and exterior faces and provided with a pair of spaced apart apertures, said bottom base engageable with said interior face, and said retainer means engageable with said exterior face with said attachment means and latch means respectively extending through said apertures with said sheet material sandwiched between said bottom base and retainer means.

12. A support assembly according to claim 1 wherein, the stationary member comprises sheet material having interior and exterior faces, said retainer means engageable with said interior face, fastener means securing said retainer means to said sheet material, and said attachment means maintaining said retainer means in direct contact with said retainer means.

* * * * *